US 7,586,652 B2

(12) United States Patent
Hoffman et al.

(10) Patent No.: US 7,586,652 B2
(45) Date of Patent: Sep. 8, 2009

(54) SYSTEMS AND METHODS FOR MAGNETIC AND COLOR INK PRINTING

(75) Inventors: Martin F. Hoffman, Monrovia, CA (US); Peter S. Fisher, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 581 days.

(21) Appl. No.: 11/191,049

(22) Filed: Jul. 28, 2005

(65) Prior Publication Data

US 2007/0024882 A1    Feb. 1, 2007

(51) Int. Cl.
*H04N 1/23* (2006.01)
*B41J 2/325* (2006.01)

(52) U.S. Cl. .................................. 358/300; 347/172

(58) Field of Classification Search .................. 358/1.1, 358/1.9, 300, 296, 400; 347/1, 111, 115, 347/117, 172
See application file for complete search history.

(56) References Cited

U.S. PATENT DOCUMENTS

| 4,901,114 A * | 2/1990 | Parker et al. ................. 399/232 |
| 5,789,727 A * | 8/1998 | Teradaira et al. ............. 235/449 |
| 2003/0046454 A1 * | 3/2003 | Hoffmann et al. .............. 710/8 |

* cited by examiner

*Primary Examiner*—Gabriel I Garcia
(74) *Attorney, Agent, or Firm*—Oliff & Berridge, PLC

(57) ABSTRACT

Systems and methods of rendering images may include rendering images by coupling a first rendering device and a second rendering device, obtaining electronic image data comprising a first image data and a second image data, and providing at least the first image data to the first rendering device and providing at least the second image data to the second rendering device. The systems and methods may also include rendering a first image on a recording medium based on the first image data using the first rendering device, transferring the recording medium from the first rendering device to the second rendering device, and rendering a second image on the recording medium based on the second image data using the second rendering device.

17 Claims, 4 Drawing Sheets

SYSTEMS AND METHODS FOR MAGNETIC AND COLOR INK PRINTING

BACKGROUND

The exemplary systems and methods described herein relate to the fields of Magnetic Ink Character Recognition (MICR) printing and color printing.

Color printing and MICR printing have been widely used by the imaging industry to print images on various types of recording medium. Color printing is a process using color ink/toner to create color images. MICR is a monochrome printing process using magnetic ink/toner and special fonts to create machine readable information. A document having both color printed information and MICR printed information may be aesthetic and may be quickly processed. Such documents have been particularly appealing to the security industry. Specifically, the combination of color printing and MICR printing has been helpful in creating and encoding security documents and/or negotiable documents, such as checks, stocks, bonds, legal documents, vehicle titles, gift certificates, and the like.

For example, color printing and MICR printing have been particularly useful in generating financial documents, such as checks, accepted by financial institutions. Generally, non-variable information including check backgrounds, such as graphical designs, pictures, and the like, has been printed via offset color presses. Variable information, for example, information that may differ from check to check, has been printed via MICR printers. The variable information may include a customer's name, address, telephone number, bank name, a check number, and the like, as well as, an MICR line that may include a bank routing number and a personal account number printed at the bottom of each check. However, traditional offset color presses cannot produce variable information in color, for example, different color information on every sheet of paper.

Digital color presses do allow variable information to be printed in color, and also provide a larger range of color backgrounds than traditional offset color printers. As a result, variable information such as a person's name may be produced in color, and the background may be any picture, such as the person's dog. Therefore, digital color presses provide greater options than traditional offset color presses. However, in printing checks using traditional offset presses or digital color presses, the check backgrounds are typically printed by color presses at one location, and the variable check information are subsequently printed by MICR printers at another location.

SUMMARY

Although a printing process using a digital color press to print color may provide more color printing options than traditional offset color presses, increasing the available color printing options does not actually resolve problems associated with subsequent MICR printing on a document rendered with color printing.

MICR printing is incompatible with traditional offset color printers and digital color printers. Specifically, traditional offset color printers and digital color printers do not include a MICR marking engine. Likewise, MICR printers do not include a color marking engine. Because MICR printing and color printing both require separate print engines specifically formatted for MICR ink and color ink, respectively, the color printer and the MICR printer each require separate and different print files to complete one print job. The creation of multiple print files for one print job may be costly and time consuming. Therefore, it is desirable to couple the MICR printing and color printing and reduce the number of print files associated with a print job.

The process of color printing prior to MICR printing on a same document has also been problematic in terms of available options and revenue. For example, check manufactures may produce letter checks that include multiple checks on a single sheet of paper. However, the conventional process is to first print a color background on an offset or digital color printer located at a check manufacturer's site. MICR information is subsequently printed at a customer's site. As a result, check manufacturers have to find enough customers that want the same check background within a short amount of time.

In the case of a twelve check preprinting, for example, the check manufacturer is required to find twelve customers that want the same check background in a very short window, such as three days, in which they have to turn around an order for checks. If the check manufacture is unable to obtain twelve customers who are willing to buy the preprinted checks, the remaining checks containing the preprinted backgrounds are not used. The unused preprinted checks may be considered voids that result in lost profits. Therefore, it is desirable to create various check backgrounds on a substantially white, for example, predominantly blank or unmarked, recording medium and to not have any voids created as a result of preprinted checks.

The process of color printing prior to MICR printing on a same document has also been problematic in terms of accuracy of the color and MICR printed document. For example, a traditional offset color printer or a digital color printer may print color on a blank/substantially white recording medium. Subsequently, the color printed recording medium may be sent to the MICR printer for printing variable information on an MICR printer. Because a fuser temperature of traditional offset color printers and the digital color printers is usually lower than a fuser temperature of the MICR printer, the previously printed color may melt in the MICR printer because of the higher fuser temperature of the MICR printer. Thus, the color and MICR printed image is no longer accurate because of imperfections resulting from the melting of the previously printed color. Therefore, it is desirable to create a printed document that reduces such printing imperfections.

Exemplary embodiments may involve rendering images by coupling a first rendering device and a second rendering device, obtaining electronic image data comprising a first image data and a second image data, providing at least the first image data to the first rendering device and providing at least the second image data to the second rendering device, rendering a first image on a recording medium based on the first image data using the first rendering device, transferring the recording medium from the first rendering device to the second rendering device, and rendering a second image on the recording medium based on the second image data using the second rendering device.

Exemplary embodiments may include locating the first rendering device in close proximity to the second rendering device.

Exemplary embodiments may include obtaining color ink print data as the first image data.

Exemplary embodiments may include obtaining magnetic ink print data as the second image data.

Exemplary embodiments may include simultaneously providing at least the first image data to the first rendering device and at least the second rendering device to the second rendering device.

Exemplary embodiments may include consecutively providing at least the first image data to the first rendering device and at least the second rendering device to the second rendering device.

Exemplary embodiments may include providing the first image data and the second image data to each of the first rendering device and the second rendering device.

Exemplary embodiments may include nullifying the second image data in the first rendering device.

Exemplary embodiments may include nullifying the first image data in the second rendering device.

Exemplary embodiments may include providing only the first image data of the first and second image data to the first rendering device.

Exemplary embodiments may include providing only the second image data of the first and second image data to the second rendering device.

Exemplary embodiments may include rendering the first image on at least one of a substantially blank recording medium and a substantially white recording medium.

Exemplary embodiments may include manually transferring the recording medium.

Exemplary embodiments may include automatically transferring the recording medium.

Exemplary embodiments of a system for rendering images may include a first rendering device, a second rendering device coupled to the first rendering device, and a host device that obtains electronic image data comprising a first image data and a second image data and provides at least the first image data to the first rendering device and at least the second image data to the second rendering device, wherein the first rendering device is configured to render a first image on a recording medium based on the first image data, and wherein the second rendering device configured to render a second image on the recording medium based on the second image data.

Exemplary embodiments of a system may include a transferring device that transfers the recording medium from the first rendering device to the second rendering device.

Exemplary embodiments of a system may include color ink print data and magnetic ink data.

Exemplary embodiments may include a xerographic device including the system for rendering images.

These and other features are described in or are apparent from the following detailed description.

BRIEF DESCRIPTION OF THE DRAWINGS

Various exemplary details are described herein, with reference to the following figures, wherein like numerals refer to like parts, and wherein.

DETAILED DESCRIPTION OF EMBODIMENTS

The following detailed description is directed to named colors selected from a specified color library, such as a PANTONE® Color Library. However, it should be appreciated that the description is for ease of understanding and familiarity only, and does not exclude named colors selected from other types of specified color libraries, whether known or later developed.

Figure 1:
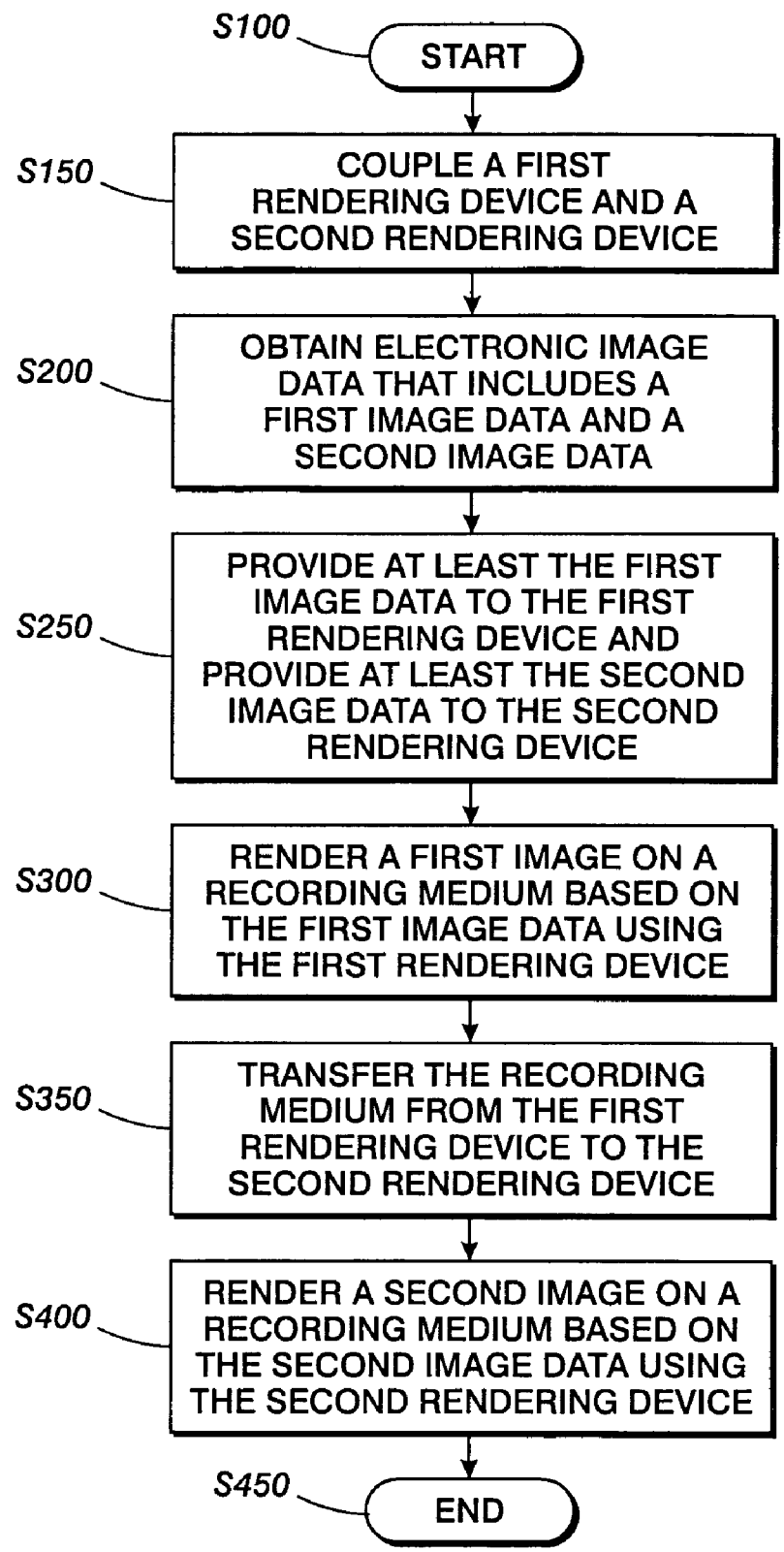
FIG. 1 is a flowchart outlining an exemplary method of rendering images.

FIG. 1 is a flowchart outlining an exemplary method of rendering images. As shown in FIG. 1, operation of the method begins in step S100 and continues to step S150 in which a first rendering device and a second rendering device may be coupled. The first rendering device and the second rendering device may operate together in a tightly coupled manner such that a printed recording medium from one device may be fed directly into the other device. The printed output may be manually or automatically transferred from the first rendering device to the second rendering device.

Next, in step S200, electronic image data may be obtained by a host device, for example, a host computer, a server, and the like. The electronic image data may include information about a print job. This information may include various types of device specific image data, such as color ink print data, magnetic ink print data, and the like. It should be appreciated that the electronic image data may be obtained from any know or later developed source capable of providing a print job that includes the electronic image data.

Because the data used for MICR printing is incompatible with traditional offset printers and digital presses, it should be appreciated that the electronic image data in a print job may include MICR specific data and color specific data that may be only implemented in the respective printing device. For the ease of understanding, data that may be printed by the first rendering device, such as an offset press or a digital press, is referred to as first image data or color ink print data. Data that may be printed by the second rendering device, such as an MICR printer, is referred to as second image data or magnetic ink print data.

For example, a single print file may include electronic image data including both MICR information and color information. Therefore, the single print file may be used to print information on both an MICR printer and a color printer. A single print file, including both MICR information and color information, may be more cost efficient to develop and implement. This approach is in contrast to the traditional approach using two separate distinct print files.

Next, in step S250, at least the first image data may be provided to a first rendering device and at least the second image data may be provided to a second rendering device. The first image data and the second image data may be provided by a host device or a server, for example. The host device may simultaneously provide data to both the first and second rendering devices. Alternatively, the host device may consecutively provide data to the first and the second rendering devices. However, it should be appreciated that the manner or order of providing data may include any know or later developed device or method capable of providing the electronic image data to the rendering devices.

Next, in step S300, a first image may be rendered or printed on a recording medium, such as paper, and the like. The first image may be rendered based on the first image data using the first rendering device. Then, in step S350, the recording medium, which includes the first image, may be transferred from the first rendering device to the second rendering device. Next, in step S400, a second image may be rendered or printed on the same recording medium as the first image. The second image may be rendered based on the second image data using the second rendering device. Operation then continues to step S450, in which the method ends.

Figure 2:
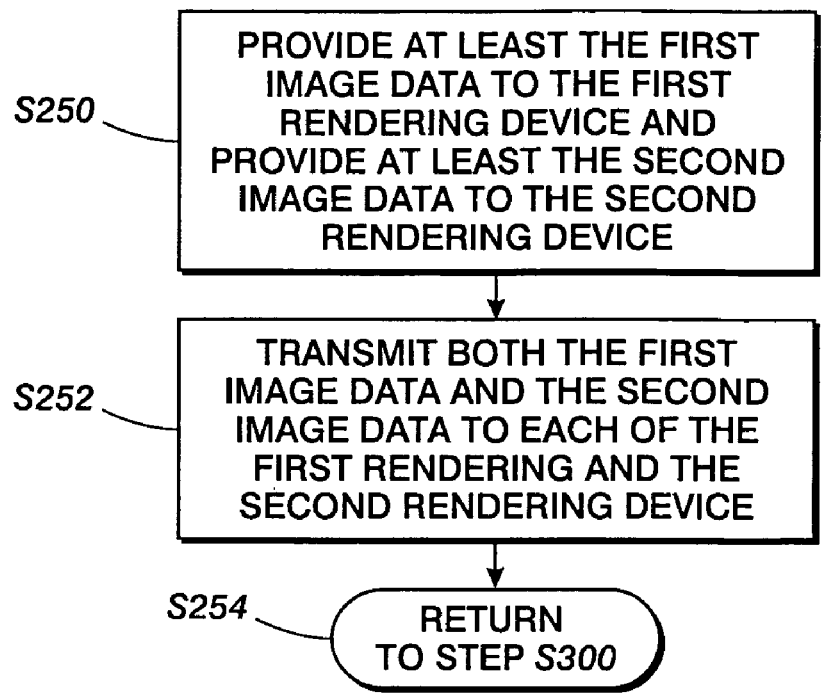
FIG. 2 is a flowchart outlining in greater detail an exemplary method of providing at least a first image data to a first rendering device and providing at least a second image data to a second rendering device.

FIG. 2 is a flowchart outlining in greater detail an exemplary method of providing at least the first image data to the first rendering device and at least the second image data to the second rendering device. As shown in FIG. 2, operation of the method continues from step S250 to step S252, in which both the first image data and the second image data are provided to each of the first rendering device and the second rendering device. Operation then continues to step S254, in which operation returns to step S300.

Figure 3:
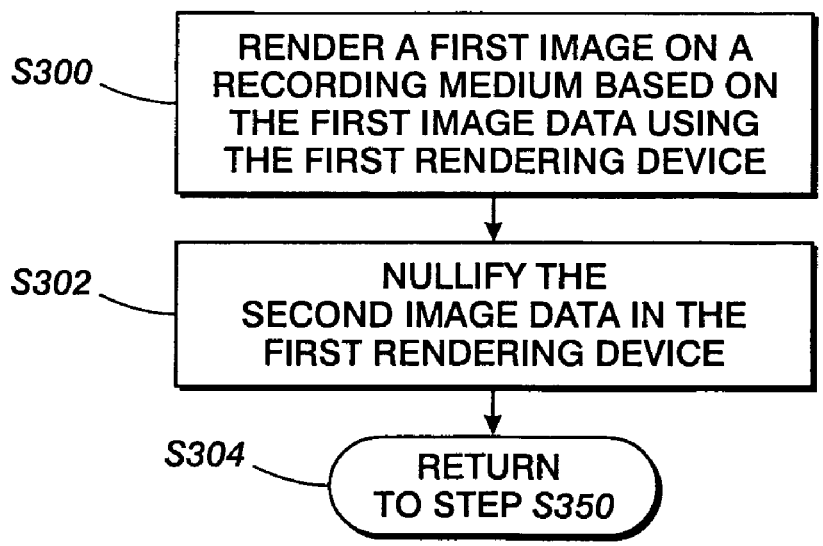
FIG. 3 is a flowchart outlining in greater detail an exemplary method of rendering a first image on a recording medium based on the first image data using a first rendering device.

FIG. 3 is a flowchart outlining in greater detail an exemplary method of rendering the first image on the recording medium based on the first image data using the first rendering device. As shown in FIG. 3, operation of the method continues from step S300 to step S302, in which the second image data may be nullified in the first rendering device.

For example, a print file may include a line condition data stream (LCDS) including a specified font. Each rendering device, for example, a printer, may include resources that are used in composing a page including the LCDS font. If an algorithm is used to nullify some of the resources adapted to compose the LCDS font, the LCDS font will not be printed. As a result, color resources in the first rendering device, for example, an MICR printer, may be nullified so color images will not be printed by the MICR printer. Additionally, MICR resources in the second rendering device, for example, a color printer, may be nullified so MICR images will not be printed by the color printer.

The LCDS approach is only one example of nullifying the second image data. It should be appreciated that the second image data may be nullified by any know or later developed device or method capable selectively processing the image data in the rendering devices.

Figure 4:
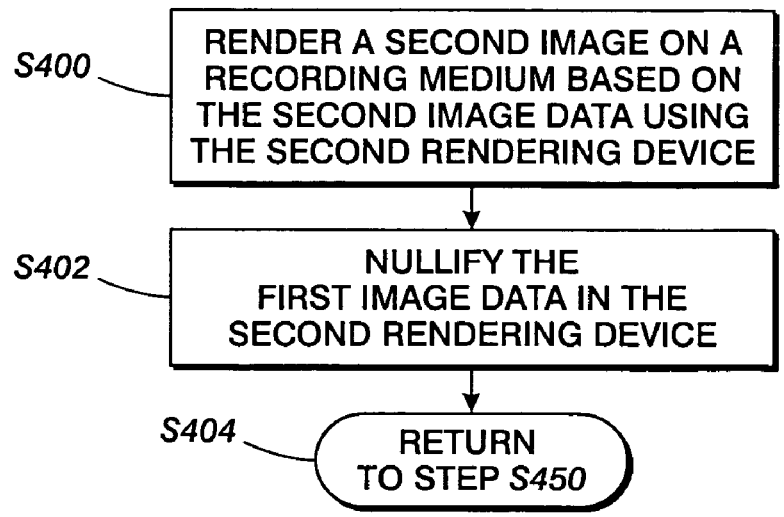
FIG. 4 is a flowchart outlining in greater detail an exemplary method of rendering a second image on the recording medium based on the second image data using a second rendering device.

FIG. 4 is a flowchart outlining in greater detail an exemplary method of rendering the second image on the recording medium based on the second image data using the second rendering device. As shown in FIG. 4, operation of the method continues from step S400 to step S402, in which the first image data may be nullified in the second rendering device.

For example, a print file may include a postscript input. The postscript input may be split into two different files, e.g., a first file including only color image data and a second file including only MICR image data.

The postscript approach is only one example of nullifying the second image data. It should be appreciated that the second image data may be nullified by any know or later developed device or method capable of selectively processing the image data in the rendering devices.

The exemplary embodiments of FIGS. 2-4 involve providing at least a first image data to a first rendering device and at least a second image data to a second rendering device. Specifically, the embodiments of FIGS. 2-4 involve providing both the first image data and the second image data, nullifying one of the first image data and the second image data, and then rendering a first image and a second image based on the respective image data that is not nullified. However, other exemplary embodiments may involve providing only the first image data to the first rendering device and only the second image data to the second rendering device.

Figure 5:
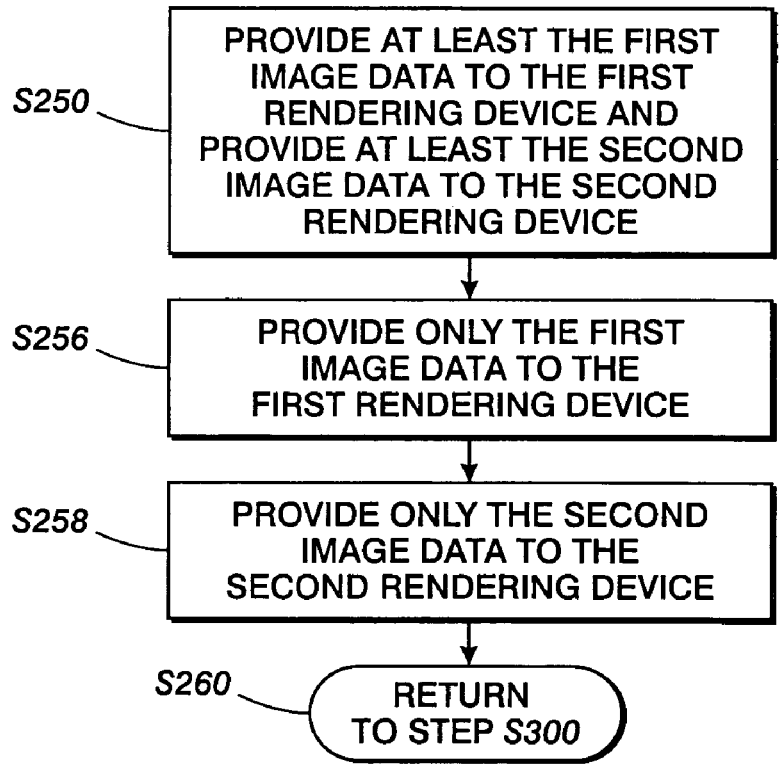
FIG. 5 is a flowchart outlining in greater detail another exemplary method of providing at least a first image data to a first rendering device and providing at least a second image data to a second rendering device.

In the exemplary embodiment of FIG. 5, a method of providing at least first image data to a first rendering device and providing at least second image data to a second rendering device may involve substantially similar steps as discussed above with respect to FIG. 1. For example, a first rendering device and a second rendering device may be coupled, electronic image data may be obtained by a host device and provided to the first rendering device and the second rendering device, and a first image may be rendered or printed on a recording medium based on the first image data using the first rendering device. Further, the recording medium may be transferred from the first rendering device to the second rendering device, and a second image may be rendered or printed on the same recording medium as the first image, based on the second image data using the second rendering device.

However, it may not be necessary to provide the entire electronic image data, for example, the first image data and the second image data, to each of the first and second rendering devices, as in step S252. Additionally, it may not be necessary to nullify the first or second image data as in steps S302 and S402.

The flowchart of FIG. 5 outlines in greater detail providing at least the first image data to the first rendering device and providing at least the second image data to the second rendering device. As shown in FIG. 5, operation of the method continues from step S250 to step S256, in which only the first image may be provided to the first rendering device. Next, in step S258, only the second image may be provided to the second rendering device. Operation then continues to step S260, in which operation returns to step S300.

Exemplary methods of rendering images may be performed according to the following example. A user may arrange a stack of sheets in an integrity order, such as 1 to n or n to 1. The user may provide or retrieve a print job, such as a print file including electronic image data including a first MICR image data and a second color image data, from a host device, such as a host computer, server, and the like. The electronic image data of the print job may then be transmitted, entirely or partly, via an input-output device, to a first monochrome MICR printer and a second color printer.

As discussed above, an MICR printer is not adapted to print using color ink or toner, and a color printer is not adapted to print using magnetic MICR ink or toner. Therefore, the MICR printer may be adapted to implement processes required by the MICR image data and render a first image using MICR ink or MICR toner. Further, the color printer may be adapted to implement processes required by the color image data and render a second image using color ink or color toner.

The stack of sheets may be initially printed, based on the MICR image data, with a first monochrome image using the MICR printer. After all of the sheets required for the print job are printed using the MICR printer, the printed sheets may be manually or mechanically transferred to an input bin of the color printer. The color printer may then print a second color image on the same recording sheets based on the color image data. As a result, the recording sheets may include monochrome MICR images printed using the MICR printer and a color background image printed using the color printer.

The first and second image data of the print file may be simultaneously or consecutively provided to both the MICR printer and the color printer. However, if the entire print file is provided to both the MICR printer and the color printer, each printer may null image data adapted for the other printer and may render an image based on the image data adapted to the respective printer. If the MICR printer and the color printer image data receive only image data specifically adapted to the respective printer, then such a nullifying process may be unnecessary.

The exemplary embodiments of the methods described above refer a preferable order in which the MICR image is rendered before the color image, for example, second image to avoid distortion of the images that may be caused by the melting of color ink or toner in a higher temperature MICR printer. However, it should be appreciated that the color image may be printed before the MICR image, for example, when such distortion is otherwise prevented or avoided.

It should be appreciated that coupling a first rendering device and a second rendering device may be done in a loosely coupled or a tightly coupled fashion so that the devices remain in close proximity, for example, adjacent to each other in the same room. As a result, security and productivity of the printed document may be enhanced because of a minimum amount of document handling. Further, the printed document may contain a xerographic signature generated as a result of the initial input print file being sent separately to the first and second rendering devices. The xerographic signature may indicate, with a high probability, that the printed document has not been subsequently altered.

Figure 6:
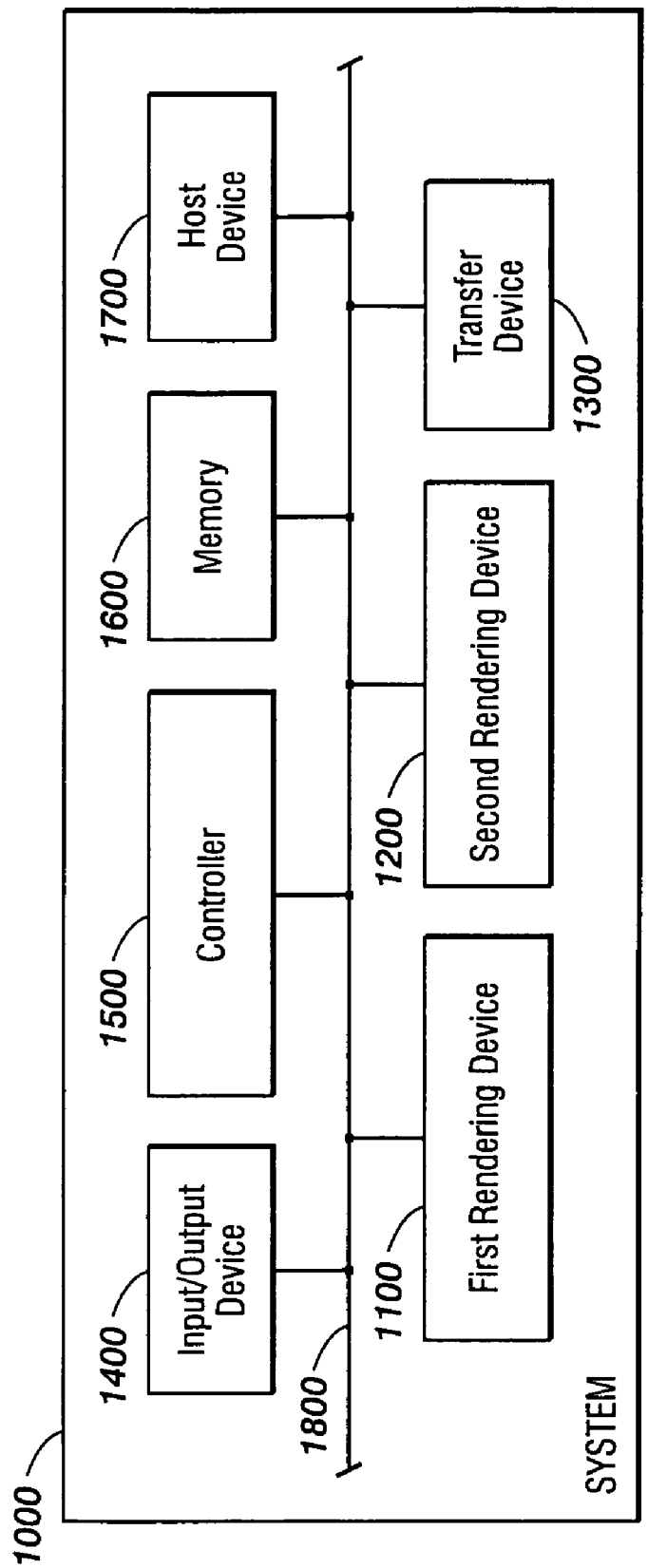
FIG. 6 is a block diagram outlining an exemplary system for rendering images.

FIG. 6 is a block diagram outlining an exemplary system for rendering images. As shown in FIG. 6, the system 1000 may include a first rendering device 1100, a second rendering device 1200, a transfer device 1300, an input output device 1400, a controller 1500, a memory 1600, a host device 1700, each appropriately connected by one or more control and/or data buses 1800.

The first rendering device 1100 and the second rendering device 1200 may each be a printer or other known or hereafter developed device capable of rendering an image in a tangible recording medium. The first rendering device 1100 and the second rendering device 1200 may be preferably arranged in close proximity, for example, adjacent to each other in a same room to provide easy transfer of the tangible recording medium.

The transfer device 1300 may be a loosely coupled manual device, a tightly coupled mechanical device or other known or hereafter developed device or means capable of transferring tangible recording media from the first rendering device 1100 to the second rendering device 1200. It should be appreciated that the transfer device 1300 may be part of the first rendering device 1100 or the second rendering device 1200, or may be eliminated by arranging first and second rendering devices 1100, 1200 together so that an input of one device directly receives an output of the other device. Further, the transfer device 1300 may be omitted when manual transfer is contemplated.

The controller 1500 may be any device such as a computer system, a processor or other device capable of identifying a user-specified or default desired state and a user-specified or default output device. Although this device is described as a separate device, it should be appreciated that this device may be a part of any type of general purpose computer or device capable of identifying various types of devices or handling other types of processing.

The memory 1600 may be implemented using any appropriate combination of alterable, volatile or non-volatile memory or non-alterable, or fixed, memory. The alterable memory, whether volatile or non-volatile, may be implemented by using any one or more of static or dynamic RAM, a floppy disk and disk drive, a writeable or rewriteable optical disk and disk drive, a hard drive, flash memory or the like. Similarly, the non-alterable or fixed memory may be implemented using any one or more of ROM, PROM, EPROM, EEPROM, and gaps in optical ROM disk, such as a CD ROM or DVD ROM disk and disk drive, or the like.

The host device 1700 may be any document source such as a host computer, a server, scanner, multifunctional device, or any other known or hereafter developed device capable of providing information of a print job to the first rendering device 1100 and the second rendering device 1200. Alternatively, the host device 1700 may be located externally of the system 1000, and input print jobs via the input output device 1400 to the system 1000.

The exemplary system for rendering images according to FIG. 6 may operate in the following manner under the control of the controller 1500 and may store captured, received or transmit information in the memory 1600 by using any known or later developed device or method. A user of the system may provide and/or receive at least one print job to and/or from the host device 1700. The print job may include electronic image data that includes a first image data and a second image data. The first image data and the second image data may be different types of data adapted for processing by different types of print engines, for example, a color print engine and a MICR print engine.

The first rendering device 1100 and the second rendering device 1200 may receive at least one of the first image data and the second image data obtained by the host device 1700 and provided via the input output device 1400. The first image data and the second image data may be provided, simultaneously or consecutively, to the first rendering device 1100 and the second rendering device 1200.

The first image data and the second image data may both be provided to each of the first rendering device 1100 and the second rendering device 1200. In such case, the first rendering device 1100 may nullify the second image data adapted for the second rendering device 1200 and may render a first image on a recording medium based on the first image data. Next, the transferring device 1300 may transfer the recording medium that includes the first image to the second rendering device 1200. Then, the second rendering device 1200 may nullify the first image data adapted for the first rendering device 1100 and may render a second image on the same recording medium based on the second image data.

Alternatively, the first image data and the second image data may each be provide to a respective one of the first rendering device 1100 and the second rendering device 1200. In this case, the first rendering device 1100 may receive only the first image data adapted for the first rendering device 1100 and may render a first image on a recording medium based on the first image data. Next, a transferring device 1300 may transfer the recording medium that includes the first image to the second rendering device 1200. Then, the second rendering device 1200 may receive only second image data adapted for the second rendering device 1200, and render a second image on the same recording medium based on the second image data.

An exemplary system for rendering images may also be incorporated in a xerograhic device and the like.

Although the above description refers to a case where the first image is rendered before the second image, it should be appreciated that the first and second images may be rendered in any order so long as both images are rendered on a same recording sheet.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of rendering images, comprising: coupling a first rendering device and a second rendering device; obtaining an electronic image data structure comprising a first image data and a second image data; providing at least the first image data to the first rendering device; providing at least the second image data to the second rendering device; rendering a first image on a recording medium based on the first image data using the first rendering device; transferring the recording medium from the first rendering device to the second rendering device; and rendering a second image on the recording medium based on the second image data using the second rendering device, wherein providing at least the first image data to the first rendering device and providing at least the second rendering data to the second rendering device are simultaneous.

2. The method of claim 1, wherein coupling the first rendering device and the second rendering device includes locating the first rendering device in close proximity to the second rendering device.

3. The method of claim 1, wherein obtaining electronic image data includes obtaining color ink print data as the first image data.

4. The method of claim 1, wherein obtaining electronic image data includes obtaining magnetic ink print data as the second image data.

5. The method of claim 1, wherein providing at least the first image data to the first rendering device and providing at least the second rendering data to the second rendering device are consecutive.

6. The method of claim 1, wherein providing at least the first image data to the first rendering device and providing at least the second rendering data to the second rendering device comprises providing the first image data and the second image data to each of the first rendering device and the second rendering device.

7. The method of claim 6, wherein rendering the first image on the recording medium, based on the first image data in the first rendering device, includes nullifying the second image data in the first rendering device.

8. The method of claim 6, wherein rendering the second image on the recording medium, based on the second image data in the second rendering device, includes nullifying the first image data in the second rendering device.

9. The method of claim 1, wherein providing at least the first image data includes providing only the first image data of the first and second image data to the first rendering device.

10. The method of claim 1, wherein providing at least the second image data includes providing only the second image data of the first and second image data to the second rendering device.

11. The method of claim 1, wherein rendering the first image includes rendering the first image on at least one of a substantially blank recording medium and a substantially white recording medium.

12. The method of claim 1, wherein transferring the recording medium from the first rendering device to the second rendering device includes manually transferring the recording medium.

13. The method of claim 1, wherein transferring the recording medium from the first rendering device to the second rendering device includes automatically transferring the recording medium.

14. A system for rendering images, comprising: a first rendering device; a second rendering device coupled to the first rendering device; and a host device that obtains an electronic image data structure comprising a first image data and a second image data, separates the first image data and the second image data, and provides at least the first image data to the first rendering device and at least the second image data to the second rendering device, wherein the first rendering device is configured to render a first image on a recording medium based on the first image data, and wherein the second rendering device is configured to render a second image on the recording medium based on the second image data, wherein providing at least the first image data to the first rendering device and providing at least the second rendering data to the second rendering device are simultaneous.

15. The system of claim 14, further comprising a transferring device that transfers the recording medium from the first rendering device to the second rendering device.

16. The system of claim 14, wherein the first image data includes color ink print data and the second image data includes magnetic ink data.

17. A xerographic device comprising the system of claim 14.

* * * * *